United States Patent
Enhessari et al.

(10) Patent No.: US 11,702,347 B2
(45) Date of Patent: Jul. 18, 2023

(54) SYNTHESIS OF MIXED METAL CHALCOGENIDES USING SOLID PHASE METHOD

(71) Applicants: Morteza Enhessari, Naragh (IR); Ali Salehabadi, Penang (MY); Asma Khoobi, Zahedan (IR)

(72) Inventors: Morteza Enhessari, Naragh (IR); Ali Salehabadi, Penang (MY); Asma Khoobi, Zahedan (IR)

(73) Assignees: NARAGH BRANCH, ISLAMIC AZAD UNIVERSITY, Naragh (IR); ENHESSARI, MORTEZA, Naragh (IR)

( * ) Notice: Subject to any disclaimer, the term of this patent is extended or adjusted under 35 U.S.C. 154(b) by 274 days.

(21) Appl. No.: 17/096,532

(22) Filed: Nov. 12, 2020

(65) Prior Publication Data

US 2021/0078871 A1 Mar. 18, 2021

Related U.S. Application Data

(60) Provisional application No. 62/934,003, filed on Nov. 12, 2019.

(51) Int. Cl.
C01B 7/01 (2006.01)
C01G 19/00 (2006.01)
C01G 3/12 (2006.01)
G01N 27/30 (2006.01)

(52) U.S. Cl.
CPC ............ *C01G 19/006* (2013.01); *C01G 3/12* (2013.01); *G01N 27/308* (2013.01)

(58) Field of Classification Search
None
See application file for complete search history.

(56) References Cited

U.S. PATENT DOCUMENTS 5,458,865 A * 10/1995 Novinson ............. C01B 19/002
423/508

\* cited by examiner

*Primary Examiner* — Sheng H Davis
(74) *Attorney, Agent, or Firm* — Bajwa IP Law Firm; Haris Zaheer Bajwa

(57) ABSTRACT

An exemplary method for producing a mixed metal chalcogenide under atmospheric pressure may include forming a reaction mixture by mixing a first metal chalcogenide and a second metal chalcogenide. An exemplary method may further include pouring a first layer of NaCl within a reactor, where an exemplary reactor may include a container and a cap. Pouring an exemplary first layer of NaCl within an exemplary reactor may include pouring an exemplary first layer of NaCl on an exemplary base end of an exemplary container of the exemplary reactor. An exemplary method may further include pouring an exemplary reaction mixture into an exemplary container on top of an exemplary first layer of NaCl, pouring a second layer of NaCl into an exemplary container on top of an exemplary reaction mixture, sealing an exemplary container by closing an exemplary cap and pouring molten NaCl on top of the exemplary cap, and heating an exemplary reactor at a predetermined temperature for a predetermined time.

20 Claims, 7 Drawing Sheets

SYNTHESIS OF MIXED METAL CHALCOGENIDES USING SOLID PHASE METHOD

CROSS-REFERENCE TO RELATED APPLICATION

This application claims the benefit of priority from U.S. Provisional Patent Application Ser. No. 62/934,003, filed on Nov. 12, 2019, and entitled "COPPER TIN SULFIDE NANOPARTICLES PREPARATION BY SALTY STEEL REACTOR WITH SULFAMETHIZOLE DETERMINATION CAPABILITY," which is incorporated herein by reference in its entirety.

TECHNICAL FIELD

The present disclosure relates to mixed metal chalcogenides and more particularly relates to systems and methods for synthesizing mixed metal chalcogenides.

BACKGROUND

Metal chalcogenides are well-known composites of metals and chalcogenide elements. Chalcogenide elements may include oxygen (O), sulfur (S), selenium (Se), tellurium (Te), and polonium (Po). Metal chalcogenides are regarded as wide-bandgap semiconductors. Wide-bandgap semiconductors may have a wide range of applications due to their high optical transparency, controllable carrier concentration, and tunable electrical conductivity. For example, wide-bandgap semiconductors may be deposited on flexible substrates, which makes them suitable for flexible electronic and optical applications.

However, there is a need for increasing capabilities of metal chalcogenides in metal chalcogenide-based devices. To this end, more complex structures of metal chalcogenides may be required. One approach to enhance electronic and optical properties of metal chalcogenides is to use mixed metal chalcogenides, which are mixed metals accompanied by chalcogenide elements. Mixing different metals with different band gaps and chalcogenides may change the overall band gap of a mixed metal chalcogenide.

Metal chalcogenides may be synthesized via different methods, such as decomposition of organometallic precursors, electrodeposition, and solid phase synthesis. Solid-phase synthesis method may involve mixing precursor elements at elevated temperatures. Synthesis of metal chalcogenide via other methods, such as decomposition of organometallic precursors and electrodeposition may require multiple steps, utilizing toxic materials and highly sensitive precursors, and may be time-consuming. On the other hand, solid phase synthesis may be a more applicable method for synthesizing metal chalcogenides. Because solid phase synthesis is faster and does not require toxic reagents. In solid phase synthesis of metal chalcogenides, two factors may be considered crucial, one factor is that no air should penetrate into a solid phase synthesis reactor and the other is that heat should be distributed homogenously all over a solid phase reactor.

There is, therefore, a need for a method and a reactor for synthesizing metal chalcogenides based on solid phase synthesis that may allow for a complete seal of the reaction chamber to ensure an airtight reaction environment. There is further a need for providing a homogenous heat distribution within a reactor that may be utilized for solid phase synthesis of metal and mixed metal chalcogenides.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for producing a mixed metal chalcogenide under atmospheric pressure. An exemplary method may include forming a reaction mixture by mixing a first metal chalcogenide and a second metal chalcogenide. An exemplary method may further include pouring a first layer of NaCl within a reactor, where an exemplary reactor may include a container and a cap. Pouring an exemplary first layer of NaCl within an exemplary reactor may include pouring an exemplary first layer of NaCl on an exemplary base end of an exemplary container of the exemplary reactor. An exemplary method may further include pouring an exemplary reaction mixture into an exemplary container on top of an exemplary first layer of NaCl, pouring a second layer of NaCl into an exemplary container on top of an exemplary reaction mixture, sealing an exemplary container by closing an exemplary cap and pouring molten NaCl on top of the exemplary cap, and heating an exemplary reactor at a predetermined temperature for a predetermined time.

In an exemplary embodiment, forming an exemplary reaction mixture may further include mixing NaCl with an exemplary first metal chalcogenide and an exemplary second metal chalcogenide with a molar ratio of (NaCl:first metal chalcogenide:second metal chalcogenide) between 3:2:1 and 2:1:1.

In an exemplary embodiment, heating an exemplary reactor may include heating an exemplary reactor at an exemplary predetermined temperature for an exemplary predetermined time. An exemplary predetermined temperature may be between 200° C. and 600° C. and an exemplary predetermined time may be between 2 hours and 4 hours.

In an exemplary embodiment, forming an exemplary reaction mixture may include mixing an exemplary first metal chalcogenide and an exemplary second metal chalcogenide. Each of an exemplary first metal chalcogenide and an exemplary second metal chalcogenide may include a metal and a chalcogenide, an exemplary metal may be selected from an exemplary group that may include boron (B), aluminum (Al), silicon (Si), gallium (Ga), germanium (Ge), arsenic (As), indium (In), tin (Sn), antimony (Sb), thallium (Tl), lead (Pb), bismuth (Bi), scandium (Sc), titanium (Ti), vanadium (V), chromium (Cr), manganese (Mn), iron (Fe), cobalt (Co), nickel (Ni), copper (Cu), zinc (zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg), an exemplary chalcogenide selected from an exemplary group may include oxygen (O), sulfur (S), selenium (Se), tellurium (Te), and polonium (Po).

In an exemplary embodiment, sealing an exemplary container may include closing an exemplary cap, where an exemplary cap may include a first end facing an inner volume of an exemplary container and a second end facing the ambient. Sealing an exemplary container may further include pouring molten NaCl on an exemplary second end of an exemplary cap where an exemplary molten NaCl may cover an entire surface of an exemplary second end of an exemplary cap.

In an exemplary embodiment, pouring an exemplary reaction mixture into an exemplary container on top of an exemplary first layer of NaCl may include covering an entire exposed top surface of an exemplary first layer of NaCl with an exemplary reaction mixture.

In an exemplary embodiment, pouring an exemplary second layer of NaCl into an exemplary container on top of an exemplary reaction mixture may include covering an entire exposed top surface of an exemplary reaction mixture with an exemplary second layer of NaCl.

In an exemplary embodiment, an exemplary method may further include producing an exemplary first metal chalcogenide by forming a first reaction mixture by mixing a first metal with a chalcogenide. An exemplary first metal may include B, Al, Si, Ga, Ge, As, In, Sn, Sb, Tl, Pb, and Bi. An exemplary chalcogenide may include O, S, Se, Te, and Po.

An exemplary method may further include pouring a first layer of NaCl within a reactor, where an exemplary reactor may include a container and a cap. Pouring an exemplary first layer of NaCl within an exemplary reactor may include pouring an exemplary first layer of NaCl on an exemplary base end of an exemplary container of the exemplary reactor. An exemplary method may further include pouring an exemplary reaction mixture into an exemplary container on top of an exemplary first layer of NaCl, pouring a second layer of NaCl into an exemplary container on top of an exemplary reaction mixture, sealing an exemplary container by closing an exemplary cap and pouring molten NaCl on top of the exemplary cap, and heating an exemplary reactor at a predetermined temperature for a predetermined time.

In an exemplary embodiment, forming an exemplary metal chalcogenide may further include mixing NaCl with an exemplary first metal and an exemplary chalcogenide with a molar ratio of (NaCl:first metal:chalcogenide) between 1:1:1 and 2:2:1.

In an exemplary embodiment, heating an exemplary reactor may include heating an exemplary reactor at an exemplary predetermined temperature for an exemplary predetermined time. An exemplary predetermined temperature may be between 200° C. and 600° C., and an exemplary predetermined time may be between 2 hours and 4 hours.

In an exemplary embodiment, sealing an exemplary reactor may include closing an exemplary cap where an exemplary cap may include a first end facing an inner volume of an exemplary container and a second end facing the ambient. Sealing an exemplary reactor may further include pouring molten NaCl on an exemplary second end of an exemplary cap where an exemplary molten NaCl covering an entire surface of an exemplary second end.

In an exemplary embodiment, an exemplary method may further include producing an exemplary second metal chalcogenide by forming a second reaction mixture by mixing a second metal with a chalcogenide where an exemplary chalcogenide may include O, S, Se, Te, and Po, and an exemplary second metal may include Sc, Ti, V, Cr, Mn, Fe, Co, Ni, Cu, zn, Y, Zr, Nb, Mo, Tc, Ru, Rh, Pd, Ag, Cd, Hf, Ta, W, Re, Os, Ir, Pt, Au, and Hg. An exemplary method may further include pouring a first layer of NaCl within a reactor, where an exemplary reactor may include a container and a cap. Pouring an exemplary first layer of NaCl within an exemplary reactor may include pouring an exemplary first layer of NaCl on an exemplary base end of an exemplary container of the exemplary reactor. An exemplary method may further include pouring an exemplary reaction mixture into an exemplary container on top of an exemplary first layer of NaCl, pouring a second layer of NaCl into an exemplary container on top of an exemplary reaction mixture, sealing an exemplary container by closing an exemplary cap and pouring molten NaCl on top of the exemplary cap, and heating an exemplary reactor at a predetermined temperature for a predetermined time.

In an exemplary embodiment, forming an exemplary second metal chalcogenide may further include mixing NaCl with an exemplary second metal and an exemplary chalcogenide with a molar ratio of (NaCl:second metal:chalcogenide) between 1:1:1 and 2:2:1.

In an exemplary embodiment, heating an exemplary reactor may include heating an exemplary reactor at an exemplary predetermined temperature for an exemplary predetermined time, where an exemplary predetermined temperature may be between 200° C. and 600° C., and an exemplary predetermined time may be between 2 hours and 4 hours.

In an exemplary embodiment, sealing an exemplary container may include closing an exemplary cap where an exemplary cap may include a first end facing an inner volume of an exemplary container and a second end facing the ambient. Sealing an exemplary container may further include pouring molten NaCl on an exemplary second end of an exemplary cap where an exemplary molten NaCl covering an entire surface of an exemplary second end of an exemplary cap.

In an exemplary embodiment, forming an exemplary second metal chalcogenide may further include washing an exemplary produced metal chalcogenide with distilled water.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

Figure 1A:
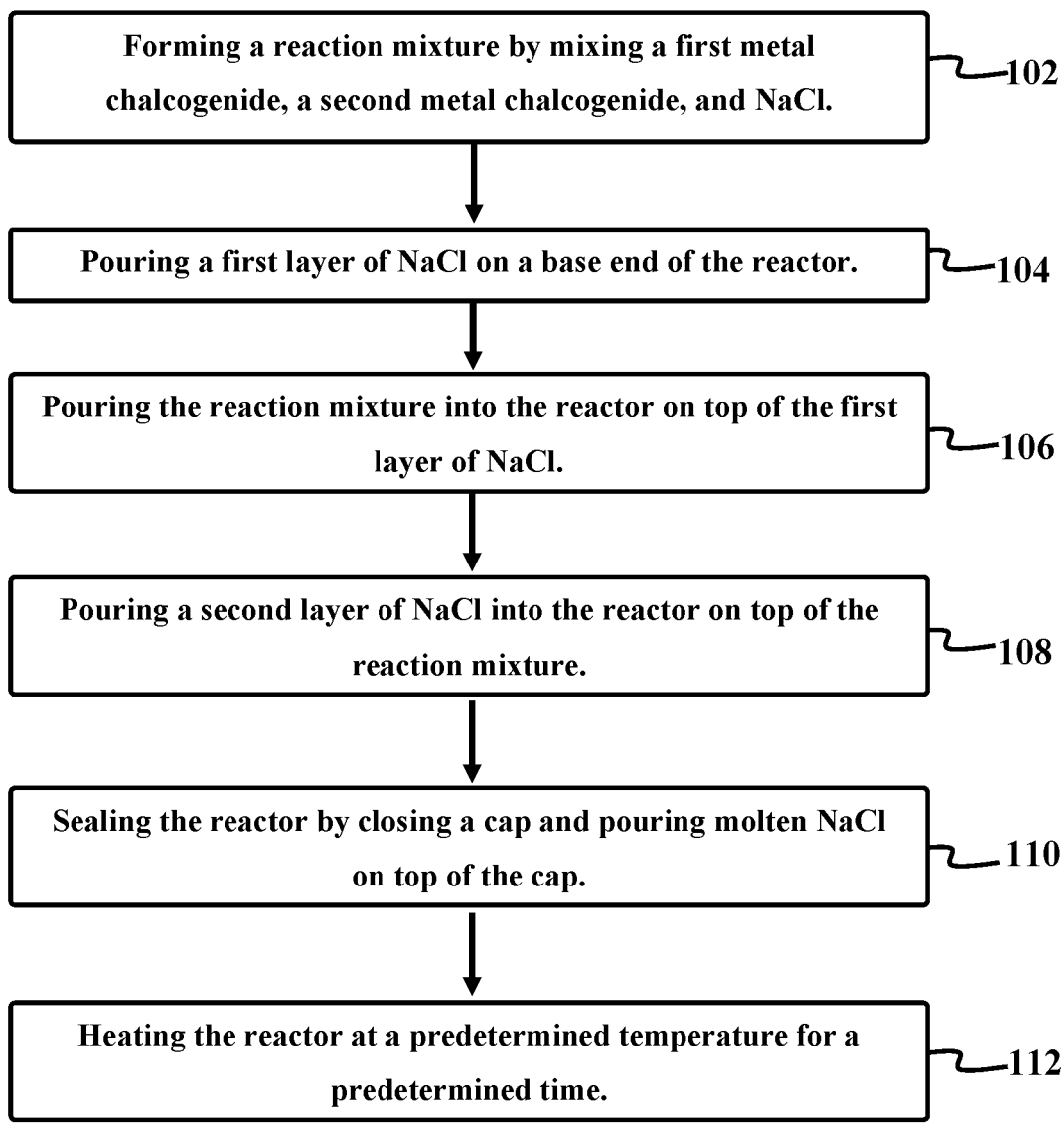
FIG. 1A illustrates a method for synthesizing mixed metal chalcogenides in a sealed reactor, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a method for producing mixed metal chalcogenides. A mixed metal chalcogenide may be produced by first synthesizing two exemplary metal chalcogenides, then forming a reaction mixture by mixing the two exemplary metal chalcogenides and NaCl, and then heating the exemplary reaction mixture in a sealed reactor. An exemplary first metal chalcogenide may be obtained by mixing NaCl, a first metal, and a chalcogenide. An exemplary first metal may be one of boron (B), aluminum (Al), silicon (Si), gallium (Ga), germanium (Ge), arsenic (As), indium (In), tin (Sn), antimony (Sb), thallium (Tl), lead (Pb), and bismuth (Bi), and an exemplary chalcogenide may be one of oxygen (O), sulfur (S), selenium (Se), tellurium (Te), and polonium (Po). An exemplary second metal chalcogenide may be obtained by mixing NaCl, a second metal, and an exemplary chalcogenide. An exemplary second metal may be one of scandium (Sc), titanium (Ti), vanadium (V), chromium (Cr), manganese (Mn), iron (Fe), cobalt (Co), nickel (Ni), copper (Cu), zinc (zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg), and an exemplary chalcogenide may be similar to the exemplary chalcogenide used for synthesizing an exemplary first metal chalcogenide.

As mentioned in the previous paragraph, exemplary mixed metal chalcogenides and exemplary metal chalcogenides may be synthesized in a sealed reactor. An exemplary sealed reactor may include a container and a cap. An exemplary container of an exemplary reactor may be closed utilizing an exemplary cap. An exemplary cap may have two sides, a first side of an exemplary cap may face an inner volume of an exemplary container and a second side of the exemplary cap may face the ambient. To seal an exemplary container, after closing an exemplary cap onto the exemplary container, molten NaCl may be poured on an exemplary second side of the exemplary cap. Molten NaCl may cover an exemplary second side of an exemplary cap and when solidified, NaCl may completely seal the exemplary cap in an airtight manner. As used herein, in an airtight manner may refer to air not being able to pass through an exemplary cap into an exemplary container.

NaCl may further be added in an exemplary container of an exemplary sealed reactor for improving heat distribution to the reaction mixture within the exemplary sealed reactor. Heat distribution within an exemplary sealed reactor may be improved due to the high heat capacity of NaCl, which is equal to 0.853 J/g·K. NaCl may be added as a layer on a base end of an exemplary container and an exemplary reaction mixture may be added on top of the NaCl layer. After adding an exemplary reaction mixture, another NaCl layer may further be added on top of the exemplary reaction mixture. In other words, an exemplary reaction mixture may be sandwiched between two layers of NaCl. As used herein, being sandwiched between two NaCl layers may refer to an exemplary reaction mixture being completely surrounded by the two exemplary NaCl layers from top and bottom. An exemplary reaction mixture may be surrounded by inner wall of an exemplary container from sides and NaCl layers from top and bottom. To synthesize an exemplary mixed metal chalcogenide, after pouring an exemplary reaction mixture in the manner described above, exemplary reactor may be heated at a predetermined temperature for a predetermined time.

In an exemplary embodiment, a sealing NaCl layer formed on top of an exemplary cap of an exemplary reactor as discussed in the preceding paragraphs may allow for sealing an inner volume of the exemplary container from ambient such that no air may penetrate through the exemplary cap into the inner volume of the exemplary container. Furthermore, in an exemplary embodiment, layers of NaCl surrounding an exemplary reaction mixture within an exemplary container may ensure a homogeneous distribution of heat within an exemplary layer of the exemplary reaction mixture.

FIG. 1A illustrates a flowchart of a method 100 for synthesizing mixed metal chalcogenides in a reactor, consistent with one or more exemplary embodiments of the present disclosure. Method 100 may include a step 102 of forming a reaction mixture by mixing a first metal chalcogenide, a second metal chalcogenide, and NaCl, a step 104 of pouring a first layer of NaCl on a base end of the reactor, a step 106 of pouring the reaction mixture into the reactor on top of the first layer of NaCl, a step 108 of pouring a second layer of NaCl into the reactor on top of the reaction mixture, a step 110 of sealing the reactor by closing a cap onto the reactor and pouring molten NaCl on top of the cap, and a step 112 of producing the mixed metal chalcogenide by heating the reactor at a predetermined temperature for a predetermined time.

In an exemplary embodiment, step 102 of forming the reaction mixture may include mixing the first metal chalcogenide, the second metal chalcogenide, and NaCl with a ratio of 2:1:3 to 1:1:2 (first metal chalcogenide:second metal chalcogenide:NaCl). In an exemplary embodiment, each of the first metal chalcogenide and the second metal chalcogenide may include a metal and a chalcogenide. In an exemplary embodiment, the metal may include at least one of boron (B), aluminum (Al), silicon (Si), gallium (Ga), germanium (Ge), arsenic (As), indium (In), tin (Sn), antimony (Sb), thallium (Tl), lead (Pb), bismuth (Bi), scandium (Sc), titanium (Ti), vanadium (V), chromium (Cr), manganese (Mn), iron (Fe), cobalt (Co), nickel (Ni), copper (Cu), zinc (zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg). In an exemplary embodiment, the chalcogenide may include oxygen (O), sulfur (S), selenium (Se), tellurium (Te), and polonium (Po). An exemplary chalcogenide may also be supplied by other sources including thiourea (TU), thioacetamide (TAA), dimethyl thiourea (DMTU), and sodium sulfide ($Na_2S$).

In an exemplary embodiment, the first metal chalcogenide, the second metal chalcogenide, and NaCl may be mixed to form an exemplary reaction mixture. In an exemplary embodiment, impurities, such as materials with low vapor temperature may be separated from an exemplary reaction mixture, due to the fact that the presence of such materials may increase the pressure inside an exemplary reactor when heat is applied to the exemplary reactor. Furthermore, the presence of such low-vapor-temperature materials may interrupt or inhibit the reaction within an exemplary reactor.

In an exemplary embodiment, the first metal chalcogenide, the second metal chalcogenide, and NaCl may be crushed in a mortar before being added to the reactor. An exemplary reaction mixture may be crushed to form a powder. In an exemplary embodiment, particle sizes of first metal chalcogenides, second metal chalcogenides, and NaCl may be less than 20 micrometers.

In an exemplary embodiment, the reaction mixture may include a first metal chalcogenide, a second metal chalcogenide, and NaCl. The reaction mixture may also be prepared using a first metal, a second metal, and sodium chalcogenides. Sodium chalcogenides may include $Na_2S_2$ or $Na_2E$ where E may be S, Se, Te or Po. An exemplary method of using sodium chalcogenides may decrease reaction processes of producing mixed metal chalcogenides to one step.

In an exemplary embodiment, step 104 of pouring the first layer of NaCl on the base end of the reactor may include filling the base end of an exemplary reactor with NaCl. In an exemplary embodiment, the first layer of NaCl may function as a heat distributor within the reactor. Such an exemplary first layer of NaCl at the base end of the reactor may allow for absorption of heat by this high-heat-capacity first layer of NaCl, where the absorbed heat may uniformly be distributed throughout the first layer of NaCl. In an exemplary embodiment, other substances with high heat capacities similar to NaCl may be used as a heat distributing layer at the base end of the reactor. For example, fluoride, chloride, and nitrate salts may be used instead of NaCl. In an exemplary embodiment, NaCl powder may be completely dried before being added to the reactor as the first layer of NaCl.

Figure 2A:
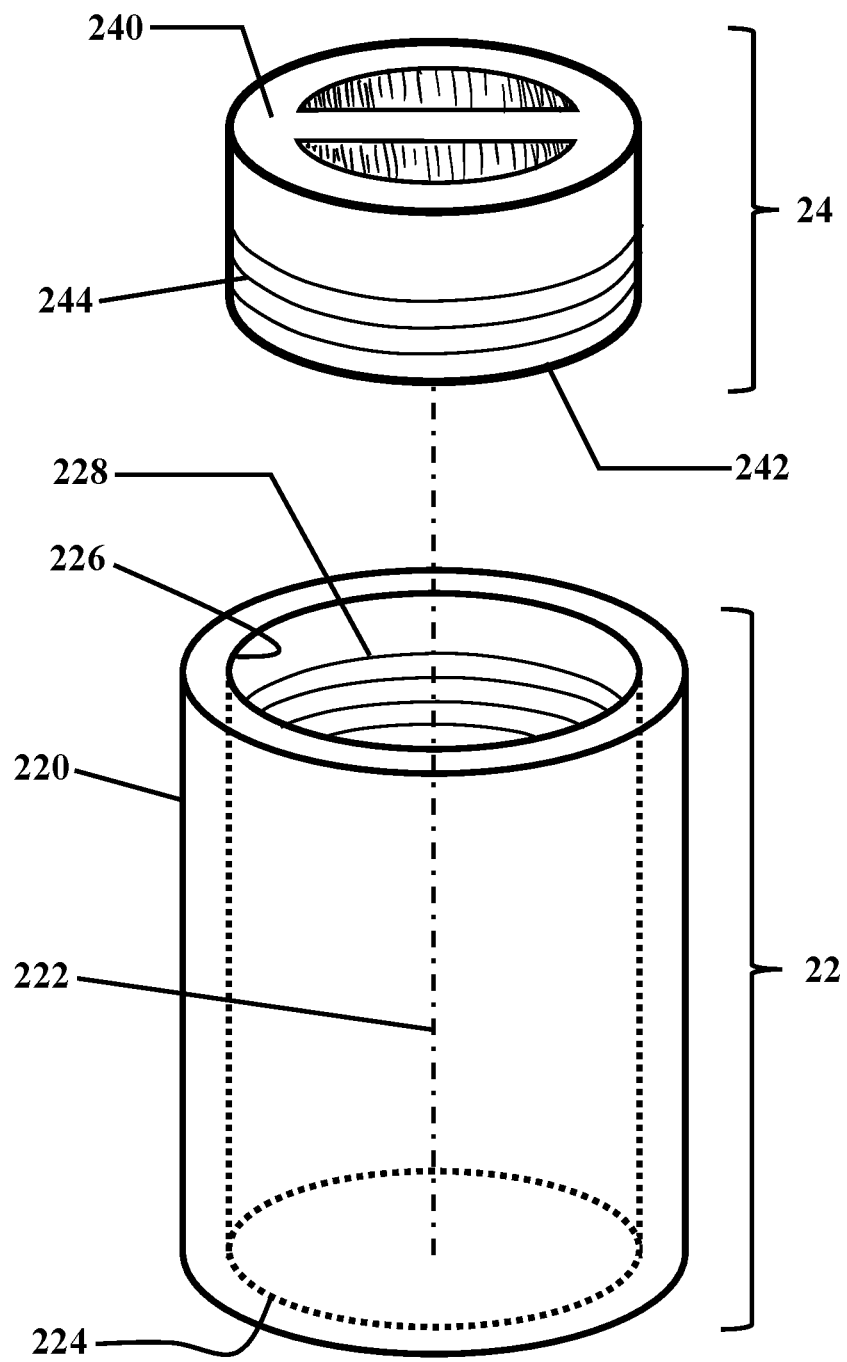
FIG. 2A illustrate a sectional perspective view of a reactor, consistent with one or more exemplary embodiments of the present disclosure.

FIG. 2A illustrate a sectional perspective view of a reactor 20, consistent with one or more exemplary embodiments of the present disclosure. In an exemplary embodiment, reactor 20 may include a container 22 and a cap 24 that may be utilized to close container 22. In an exemplary embodiment, container 22 may include a base end 224, a top end 226, and a main body 220 that may extend along a longitudinal axis 222 of container 22 between base end 224 and top end 226. As used herein, a longitudinal axis may refer to an axis associated with the longest dimension of an object. For example, container 22 may include a cylinder, where base end 224 may include a circular cross-section and main body 220 may include an annular main body extended along longitudinal axis 222 between base end 224 and top end 226. In an exemplary embodiment, longitudinal axis 222 may be perpendicular to base end 224.

Figure 2B:
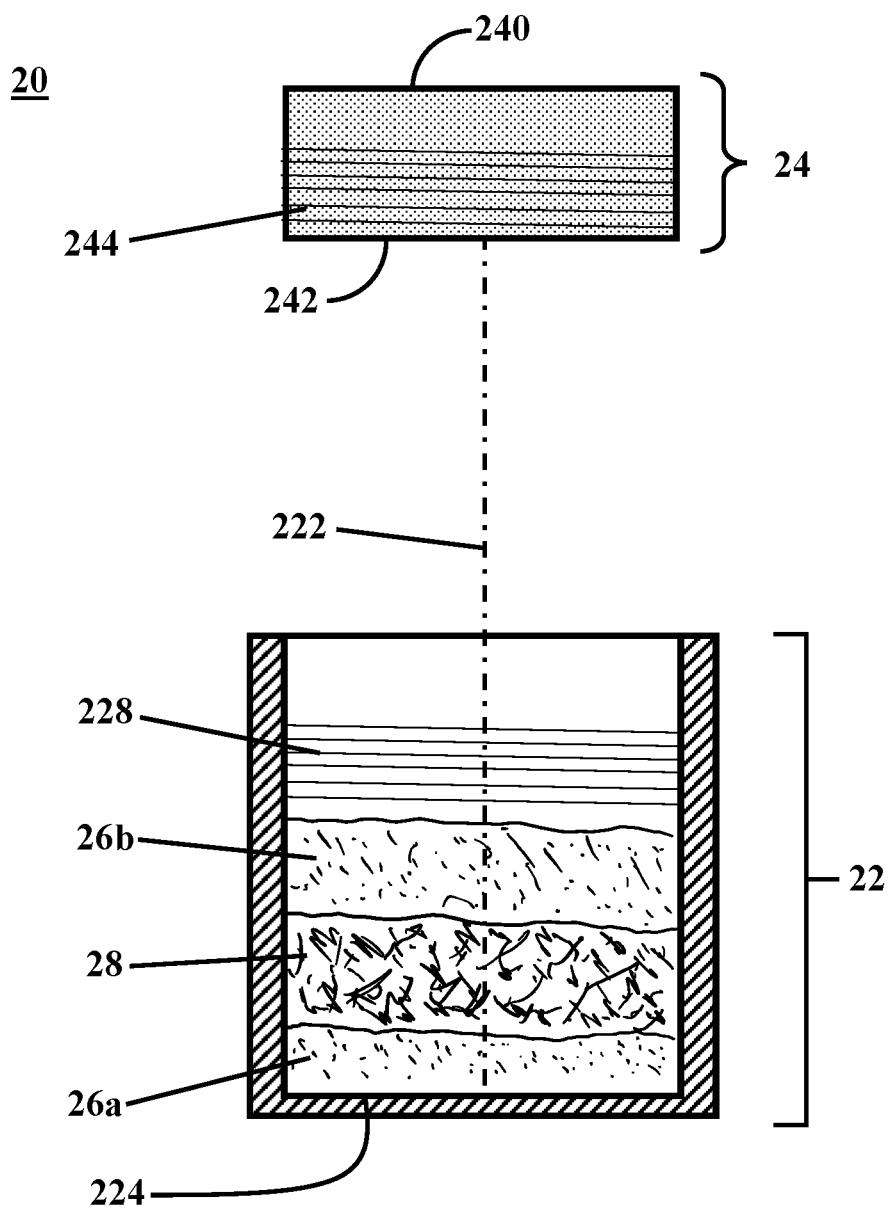
FIGS. 2B-2D illustrate sectional side views of a reactor, consistent with one or more exemplary embodiments of the present disclosure.
Figure 2C:
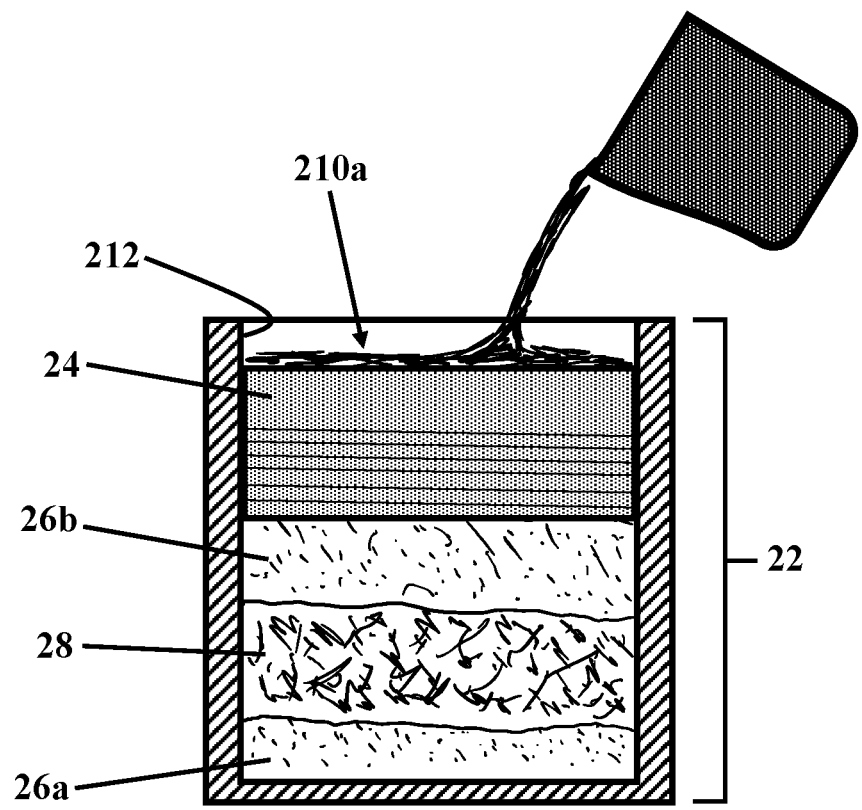
Figure 2D:
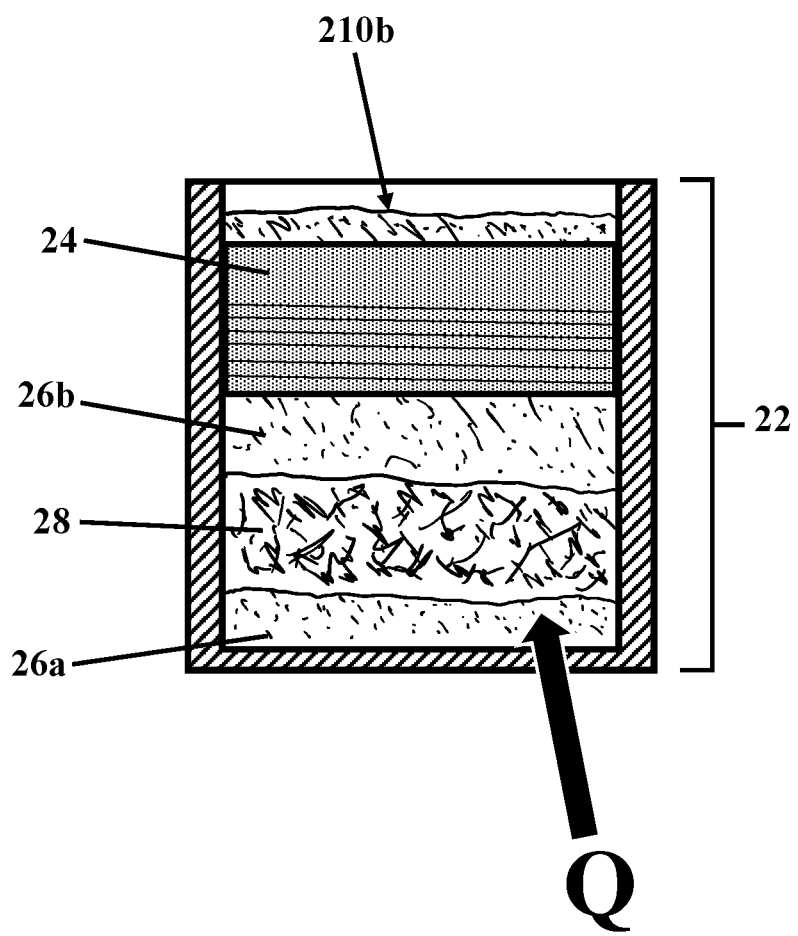

FIGS. 2B-2D illustrate sectional side views of reactor 20, consistent with one or more exemplary embodiments of the present disclosure. In an exemplary embodiment, reactor 20 may be configured to implement a method for synthesizing mixed metal chalcogenides, such as method 100. For example, step 104 of pouring the first layer of NaCl on the base end of the reactor may include pouring a first layer of NaCl (26a) on base end 224 of container 22 of reactor 20. As used herein, pouring first layer of NaCl (26a) on base end 224 may refer to pouring first layer of NaCl (26a) into container 22 of reactor 20 on a top surface of base end 224 enclosed within container 22.

In an exemplary embodiment, step 106 of pouring the reaction mixture into the reactor may include adding an exemplary reaction mixture on top the first layer of NaCl. An exemplary reaction mixture may cover an entire exposed top surface of the first layer of NaCl. For example, a reaction mixture layer 28 may be poured on top of first layer of NaCl (26a), such that reaction mixture layer 28 may cover an entire exposed top surface of first layer of NaCl (26a). In an exemplary embodiment, first layer of NaCl (26a) and reaction mixture layer 28 may be cylindrical layers with their normal axes parallel with longitudinal axis 222. As used herein a normal axis of an object may refer to an axis perpendicular to the largest surface of that object and a longitudinal axis of an object may refer to an axis associated with the largest dimension of that object.

In an exemplary embodiment, step 108 of pouring the second layer of NaCl into the reactor may include adding an exemplary second layer of NaCl on top of the reaction mixture. For example, a second layer of NaCl (26b) may be poured on top of reaction mixture layer 28, such that second layer of NaCl (26b) may cover an entire exposed top surface of reaction mixture layer 28. In other words, in an exemplary embodiment, reaction mixture layer 28 may be longitudinally positioned between first layer of NaCl (26a) and second layer of NaCl (26b). In an exemplary embodiment, first layer of NaCl (26a), second layer of NaCl (26b), and reaction mixture layer 28 may include cylindrical layers, longitudinal axes of which may be parallel with each other extended along longitudinal axis 222. As mentioned before in connection with step 104, in an exemplary embodiment, other substances with high heat capacities similar to NaCl may be used as a heat distributing layer at the base end of the reactor. For example, fluoride, chloride, and nitrate salts may be used instead of NaCl. In an exemplary embodiment, reaction mixture layer 28 being longitudinally positioned between first layer of NaCl (26a) and second layer of NaCl (26b) may allow for a better distribution of heat within reaction mixture layer 28, due to the fact that first layer of NaCl (26a) and second layer of NaCl (26b) have high heat capacities. Such high heat capacities may allow first layer of NaCl (26a) and second layer of NaCl (26b) to store heat and then release it in a uniform manner into reaction mixture layer 28.

In an exemplary embodiment, step 110 of sealing the reactor may include closing a cap of an exemplary reactor. For example, cap 24 may be closed on top of container 22 to seal an internal volume of container 22 off from the environment. In an exemplary embodiment, cap 24 may include a first end 242 that may face the inner volume of container 22 and a second opposing end 240. In an exemplary embodiment, when cap 24 is closed on top of container 22, second opposing end 240 may face toward ambient. In an exemplary embodiment, cap 24 may further include a threaded portion 244 near first end 242 of cap 24. In an exemplary embodiment, container 22 may further include a corresponding threaded portion 228. Threaded portions 244 and 228 may allow for screwing cap 24 on top of container 22.

In an exemplary embodiment, step 110 of sealing the reactor may further include pouring a molten NaCl layer on top of an exemplary cap. For example, after closing cap 24 on container 22, a molten NaCl layer 210a may be poured on second opposing end 240 of cap 24. In an exemplary embodiment, threaded portions 244 and 228 may be adapted such that in response to screwing cap 24 on container 22, a recessed portion 212 may be formed on top of container 22. In other words, in an exemplary embodiment, when cap 24 is closed on top of container 22, main body 220 may extend beyond second opposing end 240 of cap 24 along longitudinal axis 222, such that recessed portion 212 may be formed on top of container 22. In an exemplary embodiment, molten NaCl layer 210a may be poured into recessed portion 212 on second opposing end 240 of cap 24 such that an entire exposed top surface of second opposing end 240 may be covered by molten NaCl layer 210a. In an exemplary embodiment, molten NaCl layer 210a may solidify on top of second opposing end 240 of cap 24 and may function as a sealing layer 210b. In an exemplary embodiment, formation of such sealing layer 210b on top of second opposing end 240 of cap 24 may allow for sealing the inner volume of container 22 from ambient, such that no air may penetrate through cap 24 into the inner volume of container 22. In an exemplary embodiment, solidification of molten NaCl layer 210a may further cause extraction of air molecules from the inner volume of container 22. In an exemplary embodiment, reactor 20 may also be sealed by materials other than NaCl, including a silver goop or an O-ring or even other salts.

In an exemplary embodiment, step 112 of producing the mixed metal chalcogenide may include heating the reactor in the temperature range of 200° C. to 600° C. for a period of 2 to 4 hours. An exemplary reactor may be heated in a furnace. For example, reactor 20 may be placed inside a furnace and heat (Q) may be transferred to the inner volume and contents of reactor 20. As mentioned before, in an exemplary embodiment, first layer of NaCl (26a) and second layer of NaCl (26b) may absorb the transferred heat due to their high heat capacities and then may in turn homogeneously transfer the heat to reaction mixture layer 28. In an exemplary embodiment, the mixed metal chalcogenide may be formed as a result of heating reaction mixture layer 28 at a predetermined temperature between 200° C. and 600° C. for a predetermined time between 2 hours and 4 hours.

In an exemplary embodiment, after heating reaction mixture layer 28 at the predetermined temperature for the predetermined time, the reactor may be allowed to cool down. After that, in an exemplary embodiment, the solidified sealing layer of NaCl on top of the cap of the reactor may be crushed and then the cap may be opened to access the reaction products that may mainly consist of the formed mixed metal chalcogenide. For example, after the formation reaction is over, i.e., the predetermined amount of time has passed, reactor 20 may be cooled down. After that, sealing layer 210b may easily be crushed and cap 24 may be unscrewed to access the inner volume of container 22. The reaction product, which is referred to herein as the formed mixed metal chalcogenide may be taken out of the reactor.

In an exemplary embodiment, method 100 may further include an optional step of washing the formed mixed metal chalcogenide with polar solvents including distilled water to extract an exemplary mixed metal chalcogenide.

In an exemplary embodiment, extracting an exemplary mixed metal chalcogenide may include mixing the formed mixed metal chalcogenide with distilled water with a weight ratio of 5 to 10 (weight of the distilled water/total weight of the first metal chalcogenide, the second metal chalcogenide, and NaCl). In an exemplary embodiment, mixing the formed mixed metal chalcogenide with distilled water may be carried out in a mixer such as a mechanical mixer. In an exemplary embodiment, extracting an exemplary mixed metal chalcogenide may further include filtering an exemplary mixture of the formed mixed metal chalcogenide and water utilizing a filter, such as a filter paper to separate an exemplary mixed metal chalcogenide from an exemplary reaction product.

Figure 1B:
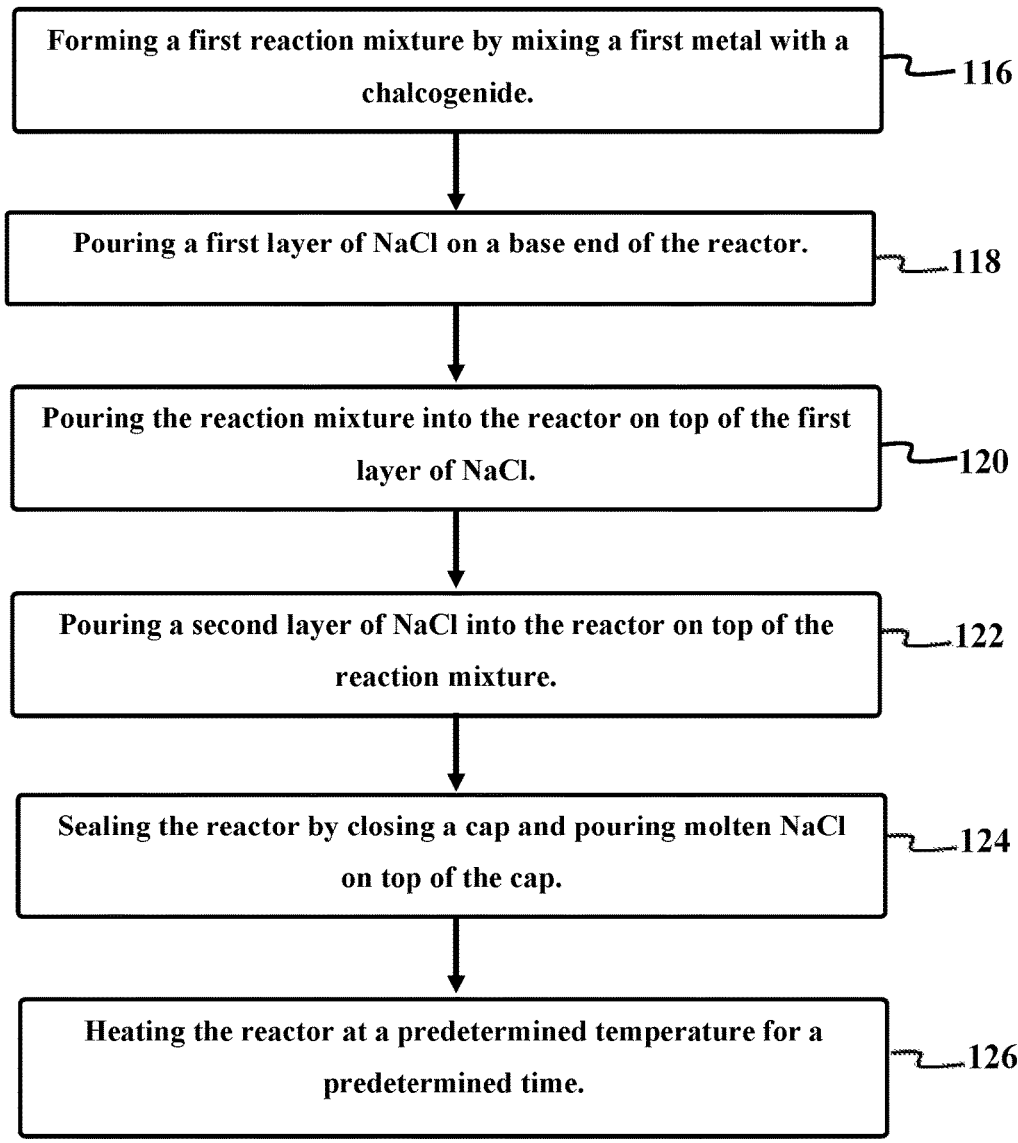
FIG. 1B illustrates a method for synthesizing a first metal chalcogenide in a sealed reactor, consistent with one or more exemplary embodiments of the present disclosure.

FIG. 1B illustrates a flowchart of a method 114 for synthesizing a first metal chalcogenide in a reactor, consistent with one or more exemplary embodiments of the present disclosure. Method 114 may include a step 116 of forming a first reaction mixture by mixing a first metal, a chalcogenide, and NaCl, a step 118 of pouring a first layer of NaCl on a base end of the reactor, a step 120 of pouring the reaction mixture into the reactor on top of the first layer of NaCl, a step 122 of pouring a second layer of NaCl into the reactor on top of the reaction mixture, a step 124 of sealing the container by closing a cap onto the reactor and pouring molten NaCl on top of the cap, and a step 126 of producing the first metal chalcogenide by heating the reactor at a predetermined temperature between 200° C. and 600° C. for a predetermined time between 2 hours and 4 hours.

In an exemplary embodiment, step 116 of forming the first reaction mixture may include mixing a first metal, a chalcogenide, and NaCl with a ratio of 1:1:1 to 2:1:2 (first metal:chalcogenide:NaCl). In an exemplary embodiment, the first metal chalcogenide may include a metal and a chalcogenide. In an exemplary embodiment, the first metal may include at least one of boron (B), aluminum (Al), silicon (Si), gallium (Ga), germanium (Ge), arsenic (As), indium (In), tin (Sn), antimony (Sb), thallium (Tl), lead (Pb), and bismuth (Bi). In an exemplary embodiment, the chalcogenide may include oxygen (O), sulfur (S), selenium (Se), tellurium (Te), and polonium (Po). An exemplary chalcogenide may also be supplied by other sources including thiourea (TU), thioacetamide (TAA), dimethyl thiourea (DMTU), and sodium sulfide (Na2S).

In an exemplary embodiment, the first metal, the chalcogenide and NaCl may be mixed to form an exemplary reaction mixture to produce the first metal chalcogenide. In an exemplary embodiment, impurities, such as materials with low vapor temperature may be separated from an exemplary reaction mixture, due to the fact that the presence of such materials may increase the pressure inside an exemplary reactor when heat is applied to the exemplary reactor. Low-vapor-temperature materials or in other words high vapor pressure materials evaporate at low temperatures. Such early evaporation may lead to the production of gaseous species inside an exemplary reactor when heat is applied, which in turn increases the pressure within an exemplary reactor. Furthermore, the presence of such low-vapor-temperature materials may interrupt or inhibit the reaction within an exemplary reactor.

In an exemplary embodiment, the first metal, the chalcogenide, and NaCl may be crushed in a mortar before being added to an exemplary reactor. An exemplary reaction mixture may be crushed to form a powder. In an exemplary embodiment, particle sizes of first metals, chalcogenides, and NaCl may be in a range of micrometer.

In an exemplary embodiment, step 118 of pouring the first layer of NaCl on the base end of the reactor may include filling the base end of an exemplary reactor with NaCl. In an exemplary embodiment, the first layer of NaCl may function as a heat distributor within the reactor. Such an exemplary first layer of NaCl at the base end of the reactor may allow for absorption of heat by this high-heat-capacity first layer of NaCl, where the absorbed heat may uniformly be distributed throughout the first layer of NaCl. In an exemplary embodiment, other substances with high heat capacities similar to NaCl may be used as a heat distributing layer at the base end of the reactor. For example, fluoride, chloride, and nitrate salts may be used instead of NaCl. In an exemplary embodiment, NaCl powder may be completely dried before being added to the reactor as the first layer of NaCl.

In an exemplary embodiment, the first metal chalcogenide may be produced in the same reactor, in which mixed metal chalcogenides were produced. In an exemplary embodiment, reactor 20 may be configured to implement a method for synthesizing the first metal chalcogenide, such as method 114. For example, step 118 of pouring the first layer of NaCl on the base end of the reactor may include pouring a first layer of NaCl (26a) on base end 224 of container 22 of reactor 20. As used herein, pouring first layer of NaCl (26a)

on base end 224 may refer to pouring first layer of NaCl (26*a*) into container 22 of reactor 20 on a top surface of base end 224 enclosed within container 22. In an exemplary embodiment, step 120 of pouring the reaction mixture into the reactor may include adding an exemplary reaction mixture on top the first layer of NaCl. An exemplary reaction mixture may cover an entire exposed top surface of the first layer of NaCl. For example, a reaction mixture layer 28 may be poured on top of first layer of NaCl (26*a*), such that reaction mixture layer 28 may cover an entire exposed top surface of first layer of NaCl (26*a*). In an exemplary embodiment, first layer of NaCl (26*a*) and reaction mixture layer 28 may be cylindrical layers with their normal axes parallel with longitudinal axis 222.

In an exemplary embodiment, step 122 of pouring the second layer of NaCl into the reactor may include adding an exemplary second layer of NaCl on top of the reaction mixture. For example, a second layer of NaCl (26*b*) may be poured on top of reaction mixture layer 28, such that second layer of NaCl (26*b*) may cover an entire exposed top surface of reaction mixture layer 28. In other words, in an exemplary embodiment, reaction mixture layer 28 may be longitudinally positioned between first layer of NaCl (26*a*) and second layer of NaCl (26*b*). In an exemplary embodiment, first layer of NaCl (26*a*), second layer of NaCl (26*b*), and reaction mixture layer 28 may include cylindrical layers, where normal axes of first layer of NaCl (26*a*), second layer of NaCl (26*b*), and reaction mixture layer 28 may be parallel with each other and longitudinal axis 222. As mentioned before in connection with step 118, in an exemplary embodiment, other substances with high heat capacities similar to NaCl may be used as a heat distributing layer at the base end of the reactor. For example, fluoride, chloride, and nitrate salts may be used instead of NaCl. In an exemplary embodiment, reaction mixture layer 28 being longitudinally positioned between first layer of NaCl (26*a*) and second layer of NaCl (26*b*) may allow for a better distribution of heat within reaction mixture layer 28, due to the fact that first layer of NaCl (26*a*) and second layer of NaCl (26*b*) have high heat capacities. Such high heat capacities may allow first layer of NaCl (26*a*) and second layer of NaCl (26*b*) to store heat and then release it in a uniform manner into reaction mixture layer 28.

In an exemplary embodiment, step 124 of sealing the reactor may include closing a cap of an exemplary reactor. For example, cap 24 may be closed on top of container 22 to seal an internal volume of container 22 off from the environment. In an exemplary embodiment, cap 24 may include a first end 242 that may face the inner volume of container 22 and a second opposing end 240. In an exemplary embodiment, when cap 24 is closed on top of container 22, second opposing end 240 may face toward ambient. In an exemplary embodiment, cap 24 may further include threaded portion 244 near first end 242 of cap 24. In an exemplary embodiment container 22 may further include a corresponding threaded portion 228. Threaded portions 244 and 228 may allow for screwing cap 24 on top of container 22.

In an exemplary embodiment, step 124 of sealing the reactor may further include pouring a molten NaCl layer on top of an exemplary cap. For example, after closing cap 24 on container 22, a molten NaCl layer 210*a* may be poured on second opposing end 240 of cap 24. In an exemplary embodiment, threaded portions 244 and 228 may be adapted such that in response to screwing cap 24 on container 22, a recessed portion 212 may be formed on top of container 22. In other words, in an exemplary embodiment, when cap 24 is closed on top of container 22, main body 220 may extend beyond second opposing end 240 of cap 24 along longitudinal axis 222, such that recessed portion 212 may be formed on top of container 22. In an exemplary embodiment, molten NaCl layer 210*a* may be poured into recessed portion 212 on second opposing end 240 of cap 24 such that an entire exposed top surface of second opposing end 240 may be covered by molten NaCl layer 210*a*. In an exemplary embodiment, molten NaCl layer 210*a* may solidify on top of second opposing end 240 of cap 24 and may function as a sealing layer 210*b*. In an exemplary embodiment, formation of such sealing layer 210*b* on top of second opposing end 240 of cap 24 may allow for sealing the inner volume of container 22 from ambient such that no air may penetrate through cap 24 into the inner volume of container 22. In an exemplary embodiment, solidification of molten NaCl layer 210*a* may further cause extraction of air molecules from the inner volume of container 22. As mentioned before, in an exemplary embodiment, reactor 20 may also be sealed by materials other than NaCl, including a silver goop or an O-ring or even other salts.

In an exemplary embodiment, step 126 of producing the first metal chalcogenide may include heating the reactor in the temperature range of 200° C. to 600° C., for a period of 2 to 4 hours. An exemplary reactor may be heated in a furnace. For example, reactor 20 may be placed inside a furnace and heat (Q) may be transferred to the inner volume and contents of reactor 20. As mentioned before, in an exemplary embodiment, first layer of NaCl (26*a*) and second layer of NaCl (26*b*) may absorb the transferred heat due to their high heat capacities and then may in turn homogeneously transfer the heat to reaction mixture layer 28. In an exemplary embodiment, the mixed metal chalcogenide may be formed as a result of heating reaction mixture layer 28 at the predetermined temperature for the predetermined time.

In an exemplary embodiment, after heating reaction mixture layer 28 at the predetermined temperature for the predetermined time, the reactor may be allowed to cool down. After that, in an exemplary embodiment, the solidified sealing layer of NaCl on top of the cap of the reactor may be crushed and then the cap may be opened to access the reaction products that may mainly consist of the formed first metal chalcogenide. For example, after the formation reaction is over, i.e., the predetermined amount of time has passed, reactor 20 may be cooled down. After that, sealing layer 210*b* may easily be crushed and cap 24 may be unscrewed to access the inner volume of container 22. The reaction product, which is referred to herein as the formed first metal chalcogenide may be taken out of the reactor.

In an exemplary embodiment, method 114 may further include an optional step of washing the formed first metal chalcogenide with polar solvents including distilled water to extract an exemplary first metal chalcogenide. In an exemplary embodiment, extracting an exemplary first metal chalcogenide may include mixing the formed first metal chalcogenide with distilled water with a weight ratio of 5 to 10 (weight of the distilled water/total weight of the first metal, the chalcogenide, and NaCl). In an exemplary embodiment, mixing the formed first metal chalcogenide with distilled water may be carried out in a mixer such as a mechanical mixer. In an exemplary embodiment, extracting an exemplary first metal chalcogenide may further include filtering an exemplary mixture of the formed first metal chalcogenide and water utilizing a filter, such as a filter paper to separate an exemplary first metal chalcogenide from an exemplary reaction product.

Figure 1C:
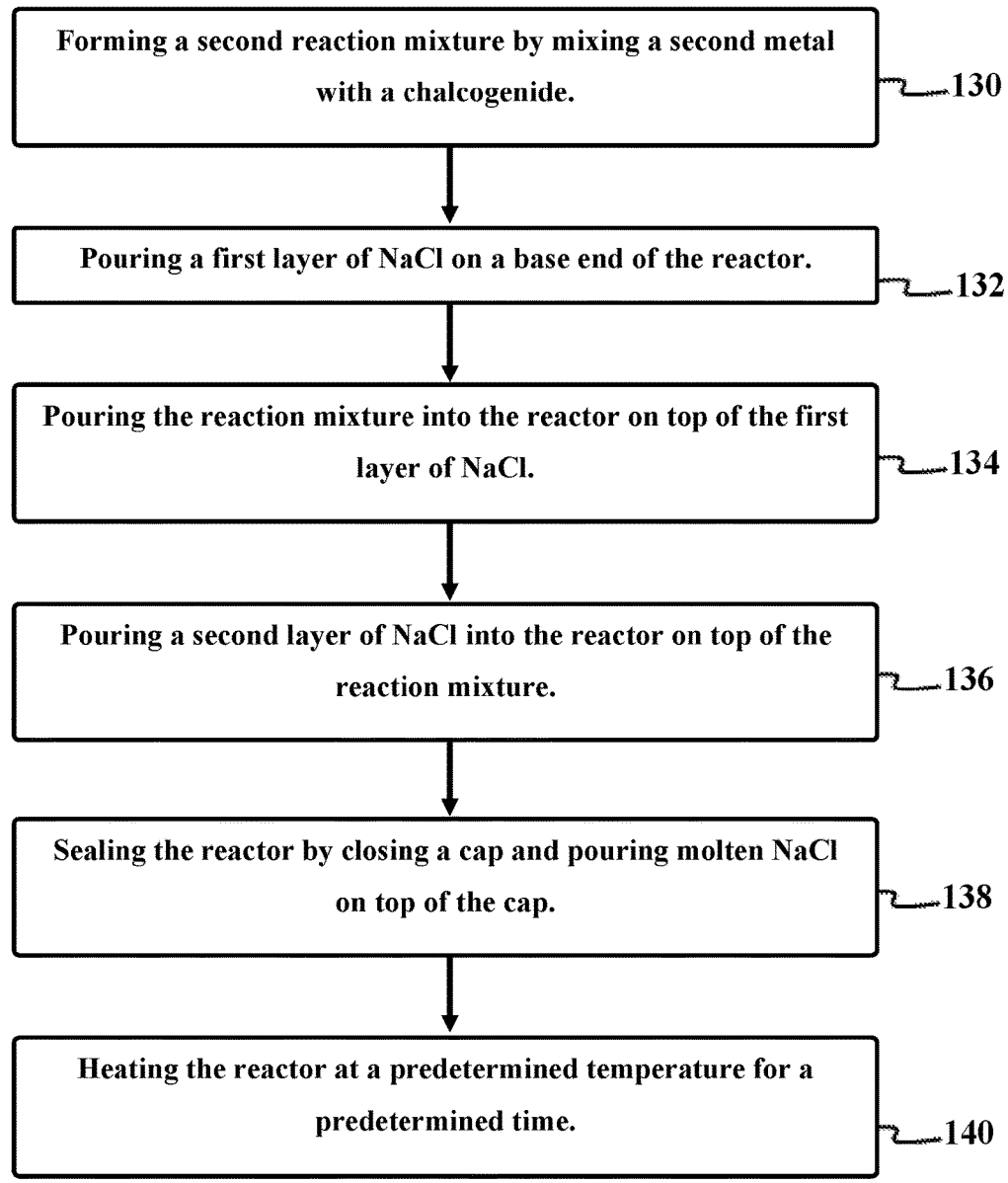
FIG. 1C illustrates a method for synthesizing a second metal chalcogenide in a sealed reactor, consistent with one or more exemplary embodiments of the present disclosure.

FIG. 1C illustrates a flowchart of a method 128 for synthesizing a second metal chalcogenide in a reactor, consistent with one or more exemplary embodiments of the present disclosure. Method 128 may include a step 130 of forming a second reaction mixture by mixing a second metal, a chalcogenide, and NaCl, a step 132 of pouring a first layer of NaCl on a base end of the reactor, a step 134 of pouring the reaction mixture into the reactor on top of the first layer of NaCl, a step 136 of pouring a second layer of NaCl into the reactor on top of the reaction mixture, a step 138 of sealing the reactor by closing a cap onto the reactor and pouring molten NaCl on top of the cap, and a step 140 of producing the second metal chalcogenide by heating the reactor at a predetermined temperature for a predetermined time.

In an exemplary embodiment, step 130 of forming the second reaction mixture may include mixing a second metal, a chalcogenide, and NaCl with a ratio of 1:1:1 to 2:1:2 (second metal:chalcogenide:NaCl). In an exemplary embodiment, the second metal chalcogenide may include a metal and a chalcogenide. In an exemplary embodiment, the metal may include at least one of scandium (Sc), titanium (Ti), vanadium (V), chromium (Cr), manganese (Mn), iron (Fe), cobalt (Co), nickel (Ni), copper (Cu), zinc (zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg). An exemplary chalcogenide may include oxygen (O), sulfur (S), selenium (Se), tellurium (Te), and polonium (Po). An exemplary chalcogenide may also be supplied by other sources including thiourea (TU), thioacetamide (TAA), dimethyl thiourea (DMTU), and sodium sulfide (Na2S).

In an exemplary embodiment, the second metal, the chalcogenide and NaCl may be mixed to form an exemplary reaction mixture to produce the second metal chalcogenide. In an exemplary embodiment, impurities, such as materials with low vapor temperature may be separated from an exemplary reaction mixture, due to the fact that the presence of such materials may increase the pressure inside an exemplary reactor when heat is applied to the exemplary reactor. Furthermore, the presence of such low-vapor-temperature materials may interrupt or inhibit the reaction within an exemplary reactor.

In an exemplary embodiment, the second metal, the chalcogenide, and NaCl may be crushed in a mortar before being added to an exemplary reactor. An exemplary reaction mixture may be crushed to form a powder. In an exemplary embodiment, particle sizes of second metals, chalcogenides, and NaCl may be in a range of micrometer.

In an exemplary embodiment, step 132 of pouring the first layer of NaCl on the base end of the reactor may include filling the base end of an exemplary reactor with NaCl. In an exemplary embodiment, the first layer of NaCl may function as a heat distributor within the reactor. Such an exemplary first layer of NaCl at the base end of the reactor may allow for absorption of heat by this high-heat-capacity first layer of NaCl, where the absorbed heat may uniformly be distributed throughout the first layer of NaCl. In an exemplary embodiment, other substances with high heat capacities similar to NaCl may be used as a heat distributing layer at the base end of the reactor. For example, fluoride, chloride, and nitrate salts may be used instead of NaCl. In an exemplary embodiment, NaCl powder may be completely dried before being added to the reactor as the first layer of NaCl.

In an exemplary embodiment, the second metal chalcogenide may be produced in the same reactor, in which mixed metal chalcogenides were produced. In an exemplary embodiment, reactor 20 may be configured to implement a method for synthesizing second the metal chalcogenide, such as method 128. For example, step 132 of pouring the first layer of NaCl on the base end of the reactor may include pouring a first layer of NaCl (26a) on base end 224 of container 22 of reactor 20. As used herein, pouring first layer of NaCl (26a) on base end 224 may refer to pouring first layer of NaCl (26a) into container 22 of reactor 20 on a top surface of base end 224 enclosed within container 22.

In an exemplary embodiment, step 134 of pouring the reaction mixture into the reactor may include adding an exemplary reaction mixture on top the first layer of NaCl. An exemplary reaction mixture may cover an entire exposed top surface of the first layer of NaCl. For example, a reaction mixture layer 28 may be poured on top of first layer of NaCl (26a), such that reaction mixture layer 28 may cover an entire exposed top surface of first layer of NaCl (26a). In an exemplary embodiment, first layer of NaCl (26a) and reaction mixture layer 28 may be cylindrical layers with their normal axes parallel with longitudinal axis 222.

In an exemplary embodiment, step 136 of pouring the second layer of NaCl into the reactor may include adding an exemplary second layer of NaCl on top of the reaction mixture. For example, a second layer of NaCl (26b) may be poured on top of reaction mixture layer 28, such that second layer of NaCl (26b) may cover an entire exposed top surface of reaction mixture layer 28. In other words, in an exemplary embodiment, reaction mixture layer 28 may be longitudinally positioned between first layer of NaCl (26a) and second layer of NaCl (26b). In an exemplary embodiment, first layer of NaCl (26a), second layer of NaCl (26b), and reaction mixture layer 28 may include cylindrical layers, longitudinal axes of which may be parallel with each other extended along longitudinal axis 222. As mentioned before in connection with step 104, in an exemplary embodiment, other substances with high heat capacities similar to NaCl may be used as a heat distributing layer at the base end of the reactor. For example, fluoride, chloride, and nitrate salts may be used instead of NaCl. In an exemplary embodiment, reaction mixture layer 28 being longitudinally positioned between first layer of NaCl (26a) and second layer of NaCl (26b) may allow for a better distribution of heat within reaction mixture layer 28, due to the fact that first layer of NaCl (26a) and second layer of NaCl (26b) have high heat capacities. Such high heat capacities may allow first layer of NaCl (26a) and second layer of NaCl (26b) to store heat and then release it in a uniform manner into reaction mixture layer 28.

In an exemplary embodiment, step 138 of sealing the reactor may include closing a cap of an exemplary reactor. For example, cap 24 may be closed on top of container 22 to seal an internal volume of container 22 off from the environment. In an exemplary embodiment, cap 24 may include a first end 242 that may face the inner volume of container 22 and a second opposing end 240. In an exemplary embodiment, when cap 24 is closed on top of container 22, second opposing end 240 may face toward ambient. In an exemplary embodiment, cap 24 may further include threaded portion 244 near first end 242 of cap 24. In an exemplary embodiment, container 22 may further include a corresponding threaded portion 228. Threaded portions 244 and 228 may allow for screwing cap 24 on top of container 22.

In an exemplary embodiment, step 138 of sealing the reactor may further include pouring a molten NaCl layer on top of an exemplary cap. For example, after closing cap 24 on container 22, a molten NaCl layer 210a may be poured on second opposing end 240 of cap 24. In an exemplary embodiment, threaded portions 244 and 228 may be adapted such that in response to screwing cap 24 on container 22, a recessed portion 212 may be formed on top of container 22. In other words, in an exemplary embodiment, when cap 24 is closed on top of container 22, main body 220 may extend beyond second opposing end 240 of cap 24 along longitudinal axis 222, such that recessed portion 212 may be formed on top of container 22. In an exemplary embodiment, molten NaCl layer 210a may be poured into recessed portion 212 on second opposing end 240 of cap 24 such that an entire exposed top surface of second opposing end 240 may be covered by molten NaCl layer 210a. In an exemplary embodiment, molten NaCl layer 210a may solidify on top of second opposing end 240 of cap 24 and may function as a sealing layer 210b. In an exemplary embodiment, formation of such sealing layer 210b on top of second opposing end 240 of cap 24 may allow for sealing the inner volume of container 22 from ambient, such that no air may penetrate through cap 24 into the inner volume of container 22. In an exemplary embodiment, solidification of molten NaCl layer 210a may further cause extraction of air molecules from the inner volume of container 22. As mentioned before, in an exemplary embodiment, reactor 20 may also be sealed by materials other than NaCl, including a silver goop or an O-ring or even other salts.

In an exemplary embodiment, step 140 of producing the second metal chalcogenide may include heating the reactor in the temperature range of 200° C. to 600° C. for a period of 2 to 4 hours. An exemplary reactor may be heated in a furnace. For example, reactor 20 may be placed inside a furnace and heat (Q) may be transferred to the inner volume and contents of reactor 20. As mentioned before, in an exemplary embodiment, first layer of NaCl (26a) and second layer of NaCl (26b) may absorb the transferred heat due to their high heat capacities and then may in turn homogeneously transfer the heat to reaction mixture layer 28. In an exemplary embodiment, the second metal chalcogenide may be formed as a result of heating reaction mixture layer 28 at the predetermined temperature for the predetermined time.

In an exemplary embodiment, after heating reaction mixture layer 28 at the predetermined temperature for the predetermined time, the reactor may be allowed to cool down. After that, in an exemplary embodiment, the solidified sealing layer of NaCl on top of the cap of the reactor may be crushed and then the cap may be opened to access the reaction products that may mainly consist of the formed second metal chalcogenide. For example, after the formation reaction is over, i.e., the predetermined amount of time has passed, reactor 20 may be cooled down. After that, sealing layer 210b may easily be crushed and cap 24 may be unscrewed to access the inner volume of container 22. The reaction product, which is referred to herein as the formed second metal chalcogenide may be taken out of the reactor.

In an exemplary embodiment, method 128 may further include an optional step of washing the formed second metal chalcogenide with polar solvents including distilled water to extract an exemplary second metal chalcogenide. In an exemplary embodiment, extracting an exemplary second metal chalcogenide may include mixing the formed second metal chalcogenide with distilled water with a weight ratio of 5 to 10 (weight of the distilled water/total weight of the second metal, the chalcogenide, and NaCl). In an exemplary embodiment, mixing the formed second metal chalcogenide with distilled water may be carried out in a mixer such as a mechanical mixer. In an exemplary embodiment, extracting an exemplary second metal chalcogenide may further include filtering an exemplary mixture of the formed second metal chalcogenide and water utilizing a filter, such as a filter paper to separate an exemplary second metal chalcogenide from an exemplary reaction product.

Example 1: Synthesizing CuS

In this example, CuS is synthesized by a method similar to method 114 of FIG. 1B. In an exemplary embodiment, copper (II) sulfide (CuS) may be synthesized by adding 0.04 mol (2.54 gr) of copper, 0.04 mol (1.28 gr) of sulfur, and 0.04 mol (2.34 gr) of NaCl in a mortar to form a reaction mixture. An exemplary reaction mixture may be crushed in the mortar for 10 minutes. In an exemplary embodiment, a first layer of NaCl (0.04 mol) may be added on a base end of a reactor. After adding the first layer of NaCl, an exemplary reaction mixture may be added on top of an exemplary first layer of NaCl. A second layer of NaCl may be added on top of an exemplary reaction mixture. An exemplary reactor may be sealed by closing a cap and pouring molten NaCl on top of an exemplary cap. An exemplary molten NaCl may be produced by heating NaCl in a furnace at a temperature of 810±10° C. An exemplary reactor may be allowed to cool down to ambient temperature and then may be heated in the furnace at 300° C. with a rate of 10° C. per minute for 4 hours. After passing the determined time, an exemplary reactor may be allowed to cool down to ambient temperature. An exemplary reactor may be opened by hitting or moisturizing solidified NaCl on top of the cap. An exemplary second layer of NaCl may be taken out to may get access to an exemplary reaction mixture. An exemplary produced CuS may be separated from NaCl by washing an exemplary reaction mixture using 50±10 milliliter of deionized water. An exemplary produced CuS may be dried by heating the produced CuS at 50±10° C. for 1 hour.

Example 2: Synthesizing SnS

In this example, SnS is synthesized by a method similar to method 128 of FIG. 1C. In an exemplary embodiment, tin (II) sulfide (SnS) may be synthesized by adding 0.04 mol (4.74 gr) of tin, 0.04 mol (1.28 gr) of sulfur, and 0.04 mol (2.34 gr) of NaCl in a mortar to form a reaction mixture. An exemplary reaction mixture may be crushed in the mortar for 10 minutes. In an exemplary embodiment, a first layer of NaCl (0.04 mol) may be added on a base end of a reactor. After adding the first layer of NaCl, an exemplary reaction mixture may be added on top of an exemplary first layer of NaCl. A second layer of NaCl may be added on top of an exemplary reaction mixture. An exemplary reactor may be sealed by closing a cap and pouring molten NaCl on top of an exemplary cap. An exemplary molten NaCl may be produced by heating NaCl in a furnace at a temperature of 810±10° C. An exemplary reactor may be allowed to cool down to ambient temperature and then may be heated in the furnace at 300° C. with a rate of 10° C. per minute for 4 hours. After passing the determined time, an exemplary reactor may be allowed to cool down to ambient temperature. An exemplary reactor may be opened by hitting or moisturizing solidified NaCl on top of the cap. An exemplary second layer of NaCl may be taken out to may get access to an exemplary reaction mixture. An exemplary produced SnS may be separated from NaCl by washing an exemplary reaction mixture using 50±10 milliliter of deionized water. An exemplary produced SnS may be dried by heating the produced SnS at 50±10° C. for 1 hour.

Example 3: Synthesizing $Cu_2SnS_3$

In this example, $Cu_2SnS_3$ is synthesized by a method similar to method 100 of FIG. 1A. In an exemplary embodiment, copper tin sulfide ($Cu_2SnS_3$) may be synthesized by adding 0.02 mol of CuS, 0.01 mol of SnS, and 0.03 mol of NaCl in a mortar to form a reaction mixture. An exemplary reaction mixture may be crushed in the mortar for 10 minutes. In an exemplary embodiment, a first layer of NaCl (0.04 mol) may be added on a base end of a reactor. After adding the first layer of NaCl, an exemplary reaction mixture may be added on top of an exemplary first layer of NaCl. A second layer of NaCl may be added on top of an exemplary reaction mixture. An exemplary reactor may be sealed by closing a cap and pouring molten NaCl on top of an exemplary cap. An exemplary molten NaCl may be produced by heating NaCl in a furnace at a temperature of 810±10° C. An exemplary reactor may be allowed to cool down to ambient temperature and then may be heated in the furnace at 500° C. with a rate of 10° C. per minute for 4 hours. After passing the determined time, an exemplary reactor may be allowed to cool down to ambient temperature. An exemplary reactor may be opened by hitting or moisturizing solidified NaCl on top of the cap. An exemplary second layer of NaCl may be taken out to may get access to an exemplary reaction mixture. An exemplary produced $Cu_2SnS_3$ may be separated from NaCl by washing an exemplary reaction mixture using 50±10 milliliter of deionized water. An exemplary produced $Cu_2SnS_3$ may be dried by heating the produced $Cu_2SnS_3$ at 50±10° C. for 1 hour.

Example 4: Utilizing Synthesized $Cu_2SnS_3$ for Detection of Sulfamethizole In this example, $Cu_2SnS_3$ is synthesized by a method similar to method 100 as of FIG. 1A. As synthesized $Cu_2SnS_3$ nanostructures may be supported on a carbon paste electrode (CPE) and may be used as a mediator for sensitive determination of sulfamethizole (SMZ). In an exemplary embodiment, supporting $Cu_2SnS_3$ nanostructures on an exemplary CPE may include forming a first suspension by mixing the $Cu_2SnS_3$ nanostructures with distilled water and then homogenizing the obtained mixture utilizing an ultrasound homogenizer. In an exemplary embodiment, supporting $Cu_2SnS_3$ nanostructures on an exemplary CPE may further include forming a second suspension by adding graphite powder to the first suspension and then homogenizing the mixture utilizing an ultrasound homogenizer. In an exemplary embodiment, supporting $Cu_2SnS_3$ nanostructures on an exemplary CPE may further include obtaining a final electrode mixture by evaporating the water content of the second suspension, adding paraffin oil to the final electrode mixture. In an exemplary embodiment, the final electrode mixture may then be poured into an electrode support. As used herein, the electrode support may be a vessel of a desired shape that may contain the final electrode mixture. A conventional three electrode electrochemical system may be used for determination of SMZ. The $Cu_2SnS_3$/CPE, a platinum wire and Ag/AgCl/KCl (3.0 M) were used as working, counter and reference electrodes, respectively.

In this example, CPE was prepared by mixing 0.5 g graphite powder with 0.18 g paraffin oil in pestle mortar. For fabrication of $Cu_2SnS_3$/CPE, an optimum amount of the as-synthesized $Cu_2SnS_3$ was added to 5.0 mL ethanol and sonicated for 30 min to get a homogenous suspension. The optimum amount was obtained based on CCRD and RSM. After that, this suspension mixed with 0.5 g graphite powder in a mortar and ethanol was evaporated by heating. Then, 0.18 g paraffin oil was added and mixed until a uniform paste was achieved. Finally, the paste was packed into the cavity of the electrode body and the surface of the electrode polished by a weighing paper.

A multivariate strategy based on central composite rotatable design (CCRD) and response surface methodology (RSM) may be used to achieve higher yield for the nanostructured modified electrode. Under the optimum conditions, the anodic peak current of SMZ was linear to its concentration in the range of 0.08-2.0 µM and 2.0-21.0 µM with detection limit of 7.7 nM.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps. Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:
1. A method for producing a mixed metal chalcogenide under atmospheric pressure, the method comprising:
   forming a reaction mixture by mixing a first metal chalcogenide and a second metal chalcogenide;
   pouring a first layer of NaCl within a reactor, the reactor comprising a container and a cap, pouring the first layer of NaCl within the reactor comprising pouring the first layer of NaCl on a base end of the container;

pouring the reaction mixture into the container on top of the first layer of NaCl;

pouring a second layer of NaCl into the container on top of the reaction mixture;

sealing the container by closing the cap and pouring molten NaCl on top of the cap; and heating the reactor at a predetermined temperature for a predetermined time.

2. The method of claim 1, wherein forming the reaction mixture further comprises:

mixing a first amount of NaCl with the first metal chalcogenide and the second metal chalcogenide with a molar ratio of (NaCl:the first metal chalcogenide:the second metal chalcogenide) between 3:2:1 and 2:1:1.

3. The method of claim 1, wherein heating the reactor comprises heating the reactor at the predetermined temperature for the predetermined time, wherein the predetermined temperature is between 200° C. and 600° C., and the predetermined time is between 2 hours and 4 hours.

4. The method of claim 1, wherein forming the reaction mixture comprises mixing the first metal chalcogenide and the second metal chalcogenide, each of the first metal chalcogenide and the second metal chalcogenide comprising a metal and a chalcogenide, the metal selected from the group consisting of boron (B), aluminum (Al), silicon (Si), gallium (Ga), germanium (Ge), arsenic (As), indium (In), tin (Sn), antimony (Sb), thallium (Tl), lead (Pb), bismuth (Bi), scandium (Sc), titanium (Ti), vanadium (V), chromium (Cr), manganese (Mn), iron (Fe), cobalt (Co), nickel (Ni), copper (Cu), zinc (zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg), the chalcogenide selected from the group consisting of oxygen (O), sulfur (S), selenium (Se), tellurium (Te), and polonium (Po).

5. The method of claim 1, wherein sealing the container comprises closing the cap, the cap comprising a first end facing an inner volume of the container and a second end facing the ambient, sealing the container further comprising pouring molten NaCl on the second end of the cap, the molten NaCl covering an entire surface of the second end.

6. The method of claim 1, further comprising washing the produced mixed metal chalcogenide with distilled water.

7. The method of claim 1, wherein pouring the reaction mixture into the container on top of the first layer of NaCl comprises covering an entire exposed top surface of the first layer of NaCl with the reaction mixture.

8. The method of claim 7, wherein pouring the second layer of NaCl into the container on top of the reaction mixture comprises covering an entire exposed top surface of the reaction mixture with the second layer of NaCl.

9. The method of claim 1, further comprising producing the first metal chalcogenide by:

forming a first reaction mixture by mixing a first metal with a chalcogenide, the first metal selected from the group consisting of B, Al, Si, Ga, Ge, As, In, Sn, Sb, Tl, Pb, and Bi, the chalcogenide selected from the group consisting of O, S, Se, Te, and Po;

pouring a first layer of NaCl within the reactor, the reactor comprising the container and the cap, pouring the first layer of NaCl within the reactor comprising pouring the first layer of NaCl on a base end of the container;

pouring the reaction mixture into the container on top of the first layer of NaCl;

pouring a second layer of NaCl into the container on top of the reaction mixture;

sealing the container by closing the cap and pouring molten NaCl on top of the cap; and heating the reactor at a predetermined temperature for a predetermined time.

10. The method of claim 9, wherein forming the first metal chalcogenide further comprises:

mixing NaCl with the first metal and the chalcogenide with a molar ratio between 1:1:1 and 2:2:1.

11. The method of claim 10, heating the reactor comprising heating the reactor at the predetermined temperature for the predetermined time, wherein the predetermined temperature is between 200° C. and 600° C. and the predetermined time is between 2 hours and 4 hours.

12. The method of claim 11, wherein sealing the container comprises closing the cap, the cap comprising a first end facing an inner volume of the container and a second end facing the ambient, sealing the container further comprising pouring molten NaCl on the second end of the cap, the molten NaCl covering an entire surface of the second end.

13. The method of claim 9, forming the first metal chalcogenide further comprising washing the produced metal chalcogenide with distilled water.

14. The method of claim 9, further comprising producing the second metal chalcogenide by:

forming a second reaction mixture by mixing a second metal with a chalcogenide, the chalcogenide selected from the group consisting of O, S, Se, Te, and Po, the second metal selected from the group consisting of Sc, Ti, V, Cr, Mn, Fe, Co, Ni, Cu, zn, Y, Zr, Nb, Mo, Tc, Ru, Rh, Pd, Ag, Cd, Hf, Ta, W, Re, Os, Ir, Pt, Au, and Hg;

pouring a first layer of NaCl within the reactor, the reactor comprising the container and the cap, pouring the first layer of NaCl within the reactor comprising pouring the first layer of NaCl on a base end of the container;

pouring the reaction mixture into the container on top of the first layer of NaCl;

pouring a second layer of NaCl into the container on top of the reaction mixture;

sealing the container by closing the cap and pouring molten NaCl on top of the cap; and heating the reactor at a predetermined temperature for a predetermined time.

15. The method of claim 14, wherein forming the second metal chalcogenide further comprises:

mixing NaCl with the second metal and the chalcogenide with a molar ratio between 1:1:1 and 2:2:1.

16. The method of claim 15, wherein heating the reactor comprises heating the reactor at the predetermined temperature for the predetermined time, wherein the predetermined temperature is between 200° C. and 600° C., and the predetermined time is between 2 hours and 4 hours.

17. The method of claim 16, wherein sealing the container comprises closing the cap, the cap comprising a first end facing an inner volume of the container and a second end facing the ambient, sealing the container further comprising pouring molten NaCl on the second end of the cap, the molten NaCl covering an entire surface of the second end.

18. The method of claim 17, wherein forming the second metal chalcogenide further comprises washing the produced metal chalcogenide with distilled water.

19. A method for producing a mixed metal chalcogenide, the method comprising:

forming a reaction mixture by mixing a first metal chalcogenide and a second metal chalcogenide;
pouring a first layer of NaCl within a reactor;
pouring the reaction mixture on top of the first layer of NaCl;
pouring a second layer of NaCl on top of the reaction mixture; and
heating the reactor.

20. The method of claim 19, wherein:
the reactor comprises a container and a cap;
pouring the first layer of NaCl within the reactor comprises pouring the first layer of NaCl into the container; and
the method further comprises sealing the container by closing the cap and pouring molten NaCl on top of the cap.

* * * * *